United States Patent
Ohtsuka

(10) Patent No.: US 8,045,185 B2
(45) Date of Patent: Oct. 25, 2011

(54) IMAGE PROCESSING APPARATUS AND METHOD OF CONTROLLING SAME

(75) Inventor: Masanori Ohtsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/620,807

(22) Filed: Nov. 18, 2009

(65) Prior Publication Data

US 2010/0060920 A1 Mar. 11, 2010

Related U.S. Application Data

(63) Continuation of application No. 10/845,169, filed on May 14, 2004, now Pat. No. 7,639,376.

(30) Foreign Application Priority Data

May 20, 2003 (JP) ................................ 2003-141397

(51) Int. Cl.
G06F 15/00 (2006.01)
H04N 1/21 (2006.01)
(52) U.S. Cl. ........................................ 358/1.1; 358/1.13
(58) Field of Classification Search ................... 358/1.1, 358/1.9, 1.13, 448
See application file for complete search history.

(56) References Cited

U.S. PATENT DOCUMENTS

| 4,907,027 A | 3/1990 | Kobe et al. ................. 354/435 |
| 5,937,217 A | 8/1999 | Ohtsuka et al. ............. 396/310 |
| 6,597,428 B1 | 7/2003 | Adachi et al. ............... 355/40 |
| 2001/0019416 A1 | 9/2001 | Monty et al. ................. 358/1.9 |
| 2002/0090213 A1 | 7/2002 | Ohtsuka ...................... 396/234 |
| 2003/0197883 A1 | 10/2003 | Lay et al. ..................... 358/1.13 |
| 2004/0027602 A1 | 2/2004 | Kuboki ....................... 358/1.13 |

FOREIGN PATENT DOCUMENTS

| JP | 8-43955 | 2/1996 |
| JP | 11-32215 | 2/1999 |

*Primary Examiner* — Thomas D Lee
(74) *Attorney, Agent, or Firm* — Fitzpatrick, Cella, Harper & Scinto

(57) ABSTRACT

In an image processing apparatus that is capable of setting desired image processing conditions for each of images that have been shot, an image of interest for which number of prints is to be set is specified and it is determined whether image processing conditions have been set for the specified image of interest. If image processing conditions have not been set for the specified image of interest, a number of prints for the image of interest is allowed to be set. If setting of number of prints has been allowed, then the setting of number of prints is accepted and the set number of prints is stored in correlation with the image of interest.

12 Claims, 6 Drawing Sheets

F I G. 6
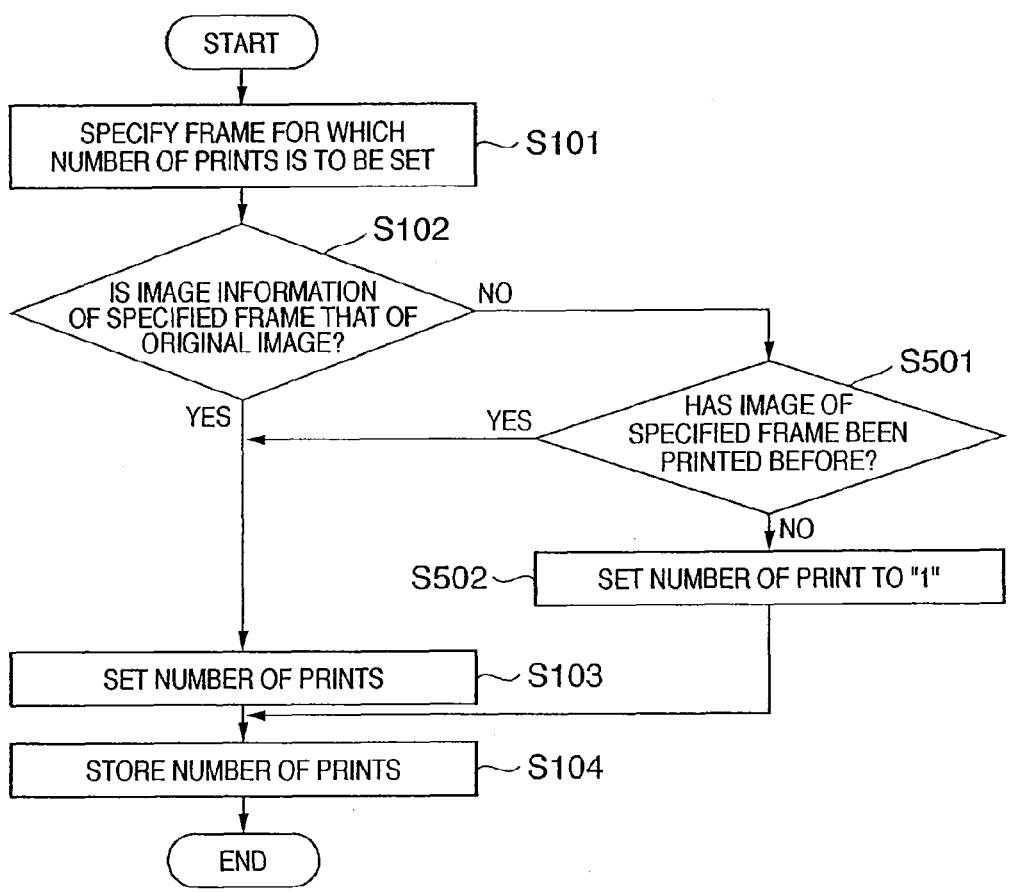

IMAGE PROCESSING APPARATUS AND METHOD OF CONTROLLING SAME

This is a continuation of U.S. patent application Ser. No. 10/845,169, filed May 14, 2004, now U.S. Pat. No. 7,639,376, issued Dec. 29, 2009.

FIELD OF THE INVENTION

This invention relates to an image processing apparatus and a method of controlling this apparatus. More particularly, the invention relates to an image processing apparatus and method of controlling same through which it is possible to set the number of prints of each image to be printed as well as the image processing conditions.

BACKGROUND OF THE INVENTION

Cameras equipped with a function for recording the number of prints on film are now in wide use. Such a camera is typified by an ASP camera.

Assume that a group photo, for example, is taken. With the above-mentioned camera, the number of prints of the group photo, which is equivalent to the number of people in the photo, is set before the photo is taken, whereby this information is recorded in a magnetic recording area of the film. Then, when the film is developed at a laboratory, the number of necessary prints can be developed. This is a very convenient feature.

There are also cameras and viewers that enable the number of prints to be set after photos have been taken. With such a device, the number of prints necessary can be recorded in one-to-one correspondence with each frame of the film after photography but before development. This eliminates errors in correspondence between a photo for which a plurality of prints are desired and number of prints. In addition, if the setting is made on the spot upon taking the photo, the user will no longer forget to make extra prints later. This also is a convenient feature.

There have also been proposals in which an already shot image or an image that will be shot has its enlargement magnification changed by trimming using an electronic zoom or the like, or in which a setting is made to print after development in a color tone different from the original color tone, as by specifying development in sepia tones.

By way of example, the specification of Japanese Patent Application Laid-Open No. 8-43955 proposes a technique in which a print zone is shown explicitly in the form of a border on an index print so as to enable identification of trimming information appended to each frame, or in which identification can be made as by a change in the color of a symbol or character that indicates a print zone. This enables the user to ascertain in advance the zone to be printed and therefore makes it possible to verify composition or make a change to trimming in simple fashion. These also are convenient features.

Further, the specification of Japanese Patent Application Laid-Open No. 11-32215 proposes the simultaneous printing of a standard original image, which is obtained by applying standard image processing to one photosensitive material, and a processed image obtained by application of processing conditions (e.g., image color tone, sharpness, gradation, trimming, enlargement magnification, etc.) different from those of the original image. With this technique, the original image and the processed image can be seen simultaneously so that the user can ascertain the differences between the images, the effects of processing, etc. This is convenient.

However, in regard to a camera or viewer equipped with both the above-mentioned function for setting and storing numbers of prints and the image processing function obtained by applying processing (e.g., image color tone, sharpness, gradation, trimming, enlargement magnification, etc.) under conditions different from those of the original image, the examples of the prior art do not particularly address the relationship between numbers of prints and image processing.

Accordingly, if, in a case where a number of prints has been set to the number of people that appear in the image, processing has been specified that will result in a sepia color (or a black-and-white photo) of the image for which the number of prints has been set, or an enlarged photo of a particular person in the image has been specified, then, with a camera or viewer that does not indicate how these functions are interrelated, the prints required may not be obtained or a large number of unnecessary prints may be produced.

SUMMARY OF THE INVENTION

The present invention has been made in consideration of the above situation and its object is to make it possible to specify the necessary number of prints without waste in a camera or viewer equipped with both a function for setting and storing numbers of prints and an image processing function for applying processing of conditions different from those of the original image.

According to the present invention, the foregoing object is attained by providing a method of controlling an image processing apparatus that is capable of setting desired image processing conditions for each image of images that have been shot, comprising: specifying an image of interest for which a number of prints is to be set; determining whether image processing conditions have been set for the specified image of interest; allowing a number of prints to be set if no image processing conditions have been set for the specified image of interest; accepting the setting of number of prints if setting of number of prints has been allowed; and storing the set number of prints in correlation with the image of interest.

According to the present invention, the foregoing object is also attained by providing a method of controlling an image processing apparatus that is capable of setting a number of print for each of images that have been shot, comprising: specifying an image of interest for which image processing conditions are to be set; determining whether a number of prints has been set for the specified image of interest; allowing image processing conditions to be set if no number of prints has been set for the specified image of interest; accepting the setting of image processing conditions if setting of image processing conditions has been allowed; and storing the set image processing conditions in correlation with the image of interest.

Further, the foregoing object is also attained by providing an image processing apparatus comprising: an image input unit adapted to inputs an image; a processing-condition setting unit adapted to set desired image processing conditions for an image; a print-count setting unit adapted to set a number of prints for each image; a controller adapted to specify an image of interest for which a number of prints is to be set, determine whether image processing conditions have been set for the specified image of interest, allow a number of prints to be set if no image processing conditions have been set for the specified image of interest, and accept the setting of number of prints if setting of number of prints has been allowed; and a storage unit adapted to store the set number of prints in correlation with the image of interest.

Furthermore, the foregoing object is also attained by providing an image processing apparatus comprising: an image input unit for inputting an image; a processing-condition setting unit adapted to set desired image processing conditions for an image; a print-count setting unit adapted to set a number of prints for each image; a controller adapted to specify an image of interest for which a number of prints is to be set, determine whether a number of prints has been set for the specified image of interest, allow image processing conditions to be set if no number of prints has been set for the specified image of interest, and accept the setting of image processing conditions if setting of image processing conditions has been allowed; and a storage unit adapted to store the set image processing conditions in correlation with the image of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart illustrating the operation of the image processing apparatus according to a modification of the first embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
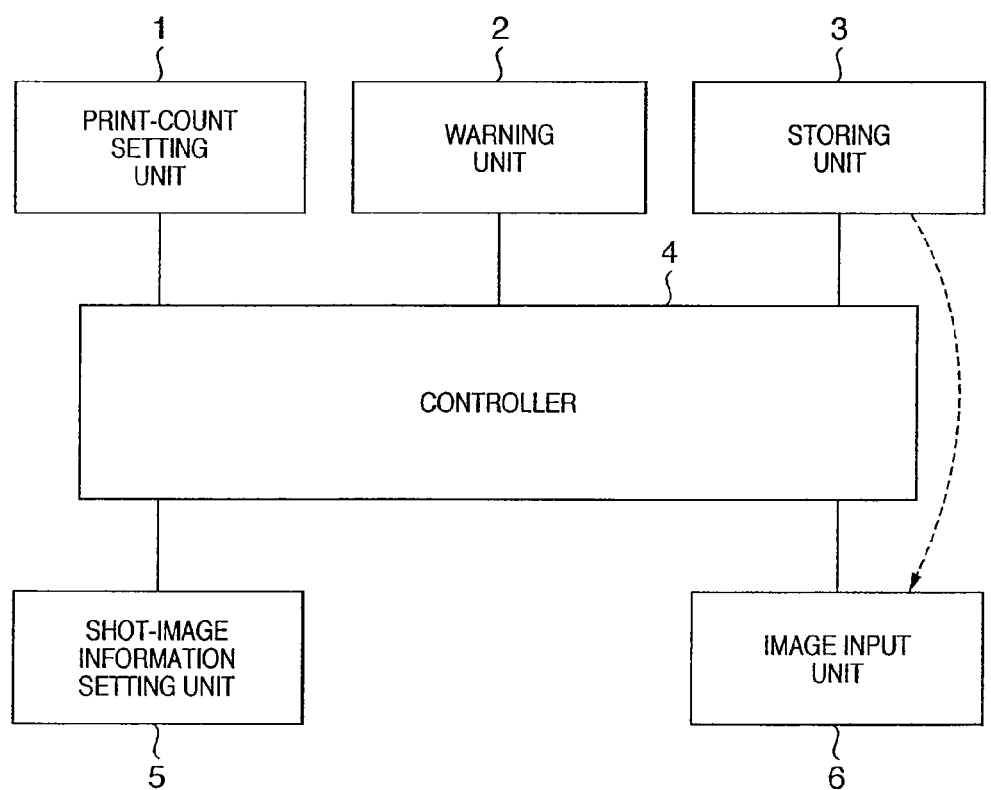
FIG. 1 is a block diagram illustrating the functional structure of an image processing apparatus according to an embodiment of the present invention.

FIG. 1 is a block diagram illustrating the functional structure of an image processing apparatus according to an embodiment of the present invention. As shown in FIG. 1, the apparatus includes a print-count setting unit 1 for setting number of prints; a warning unit 2 for alerting and warning the user about operation; a storing unit 3 for storing information, which has been set by the print-count setting unit 1, on film or in a separately provided memory; a controller 4 for performing a series of control operations; a shot-image information setting unit 5 for setting color tone, sharpness, gradation, trimming and enlargement magnification of video or an image that will be or has been shot; and an image input unit 6 for taking a picture and inputting the same or inputting image data from the outside.

The image processing apparatus shown in FIG. 1 is implemented in a camera such as an APS camera or digital camera capable of recording information appended to an image in correlation with the image, a developing printer for photographs and an information processing apparatus such as a personal computer and personal digital assistant (PDA). In case of implementation in a developing printer for photographs or in an information processing apparatus, it is possible to achieve this as part of a viewer for displaying image information obtained by reading a film or an external memory. It should be obvious to those skilled in the art that it is possible to implement the functions shown in FIG. 1 by suitably combining software and hardware with which the apparatus is equipped, such as control units including buttons, switches, a console and keyboard, etc., a display unit such as an LED or display device, a voice output unit such as a speaker, a storage device such as an internal memory and an external memory, an imaging unit inclusive of a lens and shutter, a communication unit for communicating with external devices, and a CPU.

Figure 2:
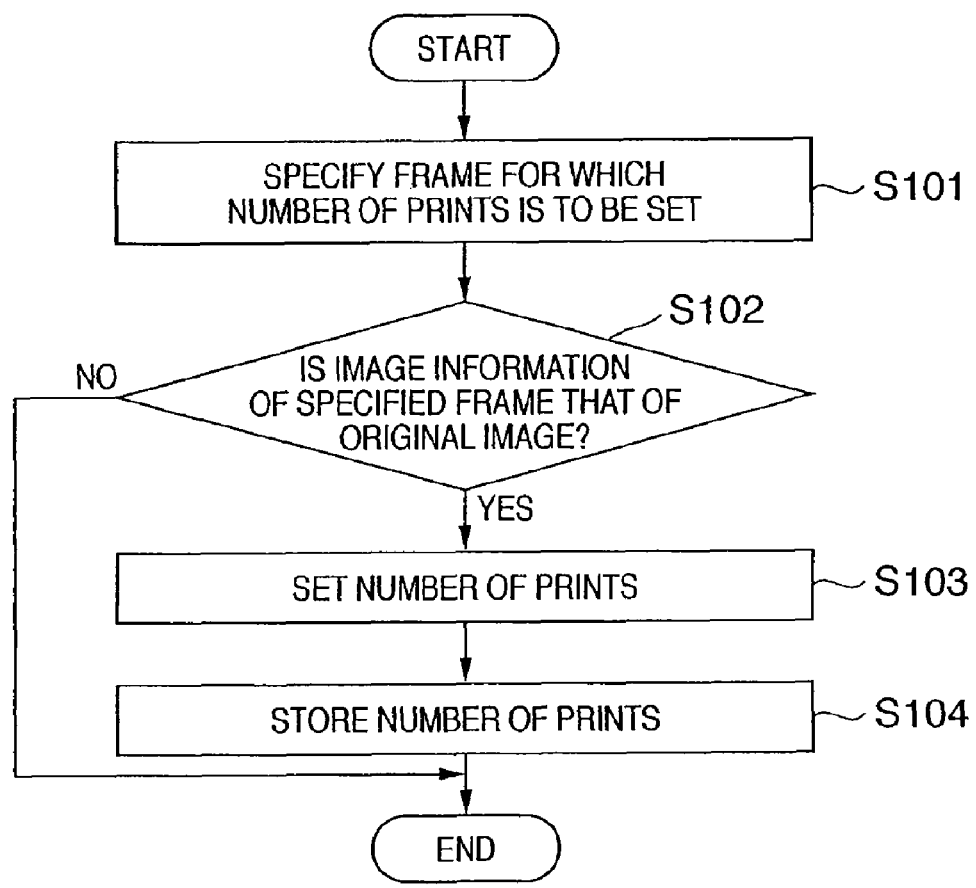
FIG. 2 is a flowchart illustrating the operation of the image processing apparatus according to a first embodiment of the present invention.

An operation for setting number of prints in the image processing apparatus of the invention constructed as shown in FIG. 1 will be described with reference to the flowchart of FIG. 2.

First, the controller 4 specifies a frame for which the number of prints is to be set (step S101). If the apparatus is a camera or the like, the operation in step S101 corresponds to an operation of, when a group photo is taken, specifying the number of prints corresponding to the total number of people in the photo that either will be shot or has been shot by the image input unit 6 before or after photography. If the apparatus is an apparatus for printing photographs or a personal computer, then the operation in step S101 corresponds to an operation of specifying a desired picture from shot images that have been entered via the image input unit 6.

Next, the controller 4 determines whether the image information of the frame specified at step S101 is that of an original image that will be shot or has been shot by a camera or the like, or whether it is an image for which some image processing conditions have been set by the shot-image information setting unit 5 (step S102). By way of example, image processing includes processing for subjecting an original image to a process for changing the color tone of the image to sepia tone or black-and-white tone, etc., for changing sharpness in order to make the image a soft-focused photograph, for trimming a specific portion of the image, for synthesising a plurality of images to produce, inter alia, a panoramic image, for synthesising an additional image such as characters or decorated characters, for deforming the image, and for inverting the image. Image processing conditions are recorded magnetically as IX information in the case of APS film or are recorded as auxiliary information of the corresponding image data in case of digital image data obtained from a digital camera or the like. Or, after an original image has been processed using set image processing conditions, there are cases where recording is by overwriting the original image with the processed image. In all of these cases it is judged that image processing conditions have been set.

If the controller 4 determines at step S102 that the image of the specified frame is an original image, then the number of prints is set for this specified image by the print-count setting unit 1 (step S103). In step S103, the number of prints is displayed in accordance with a user operation. The setting of number of prints is already well known in APS cameras and some viewers, and therefore, the explanation of it is omitted here.

The controller 4 stores the set number of prints in association with the specified frame (step S104). This ends this series of processing. With regard to storing of the number of prints, a method similar to that used for the image processing conditions may be employed. For example, in the case of APS film, the number of prints may be recorded magnetically as IX information. In the case of digital image data obtained from a digital camera or the like, the number of prints is recorded as auxiliary information of image data.

If the controller 4 determines at step S102 that the image of the frame specified for printing is not the original image, then processing is exited without steps S103 and S104 being executed.

In a case where an image that has been processed is displayed and can be recognized on a display device or index print in the event that image processing conditions have been set, a case where the image display itself is not presented, and a case where an original image is being displayed even though image processing conditions have been set, performing control in the manner described above makes it possible to prevent a situation in which the user sets a number of prints without noticing that this image is different from the original image.

Thus, in accordance with the first embodiment, as described above, the number of prints can be set only with regard to an original image in the state in which it was originally shot. As a result, while the convenience of being able to specify the number of prints of an original image is maintained, it is also possible to prevent an image that has undergone image processing from being printed wastefully because the user fails to notice that the original image will undergo image processing at the time of printing or already has undergone image processing.

Modification of the First Embodiment

In the first embodiment as described above, when it is determined at step S102 that the image of the specified frame for printing for which some image processing conditions have been set, the setting of number of print is disabled for the image. Alternatively, it may be so arranged that the setting of number of print is allowed only if "1" is set.

This is because an image (i.e., processed image) which is different from an original image is not always an image the user desires, however, a single test print of the processed image would be useful for the user to check how the image processing conditions gave the effects on the original image.

Furthermore, it may be so configured that a management area is secured in a not-shown memory, storage device, and so on, and print history information is stored in the management area, and when a user sets the number of prints for an image for which some processing conditions have been set, the print history information on the image may be checked. This operation is briefly described with reference to FIG. 6. It should be noted that, in FIG. 6, the similar operations as in FIG. 2 are referred to by the same step numbers, and description of them are omitted here.

If the controller 4 determines at step S102 that the image of the specified frame is not an original image, the process proceeds to step S501. In step S501, the controller 4 checks the print history information on the image of the specified frame and determines whether the image, processed with the set processing conditions, has been printed before.

If the image is to be printed for the first time (NO in step S501), the number of prints is set to 1 (step S502), then the process proceeds to step S104. If the image has been printed before, a user is allowed to set an arbitrary number as the number of prints, then the process proceeds to step S103.

When image processing conditions have been set to an image of the specified frame, if the image, processed with the set processing conditions, has been printed before, it is considered that a user has been checked the processed image. Accordingly, it is considered that the user wishes to print the image processed with the image processing conditions and that limiting the number of prints is inconvenient for the user.

In contrast, if the processed image has not been printed before, it is set to print a single print of the processed image as a test print.

Second Embodiment

Figure 3:
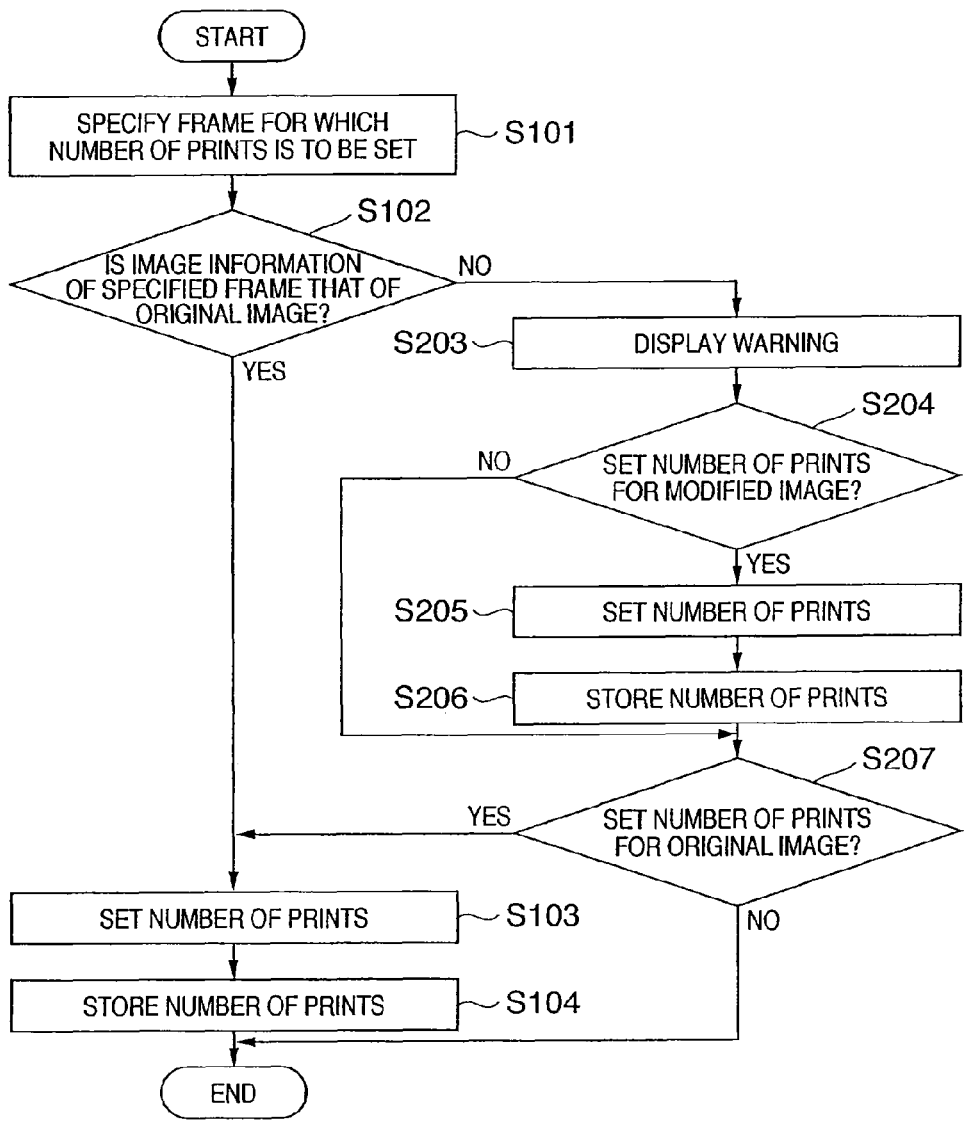
FIG. 3 is a flowchart illustrating the operation of the image processing apparatus according to a second embodiment of the present invention.

FIG. 3 is a flowchart illustrating processing for setting number of prints in an image processing apparatus according to a second embodiment of the present invention. The structure of the image processing apparatus is similar to that described with reference to FIG. 1 in the first embodiment and description thereof is omitted here. In the processing of FIG. 3, steps similar to those shown in FIG. 2 are designated by like step numbers.

First, as step S101, the controller 4 specifies a frame for which the number of prints is to be set. This is performed in a manner similar to that of step S101 in FIG. 2.

Next, the controller 4 determines whether the image information of the frame specified at step S101 is that of an original image that will be shot or has been shot by a camera or the like, or whether it is an image for which some image processing conditions have been set by the shot-image information setting unit 5 (step S102).

If the controller 4 determines at step S102 that the image of the specified frame is an original image, then the number of prints is set for this specified image by the print-count setting unit 1 (step S103).

The controller 4 stores the set number of prints in association with the specified frame (step S104). This ends this series of processing.

If the controller 4 determines at step S102 that the image of the frame specified for printing is not the original image, then the controller 4 issues a warning by the warning unit 2 in order to warn or alert the user of this fact (step S203). The warning in this case may be a warning indication on a screen, warning issued by a light-emitting element or a warning by voice.

Next, based upon a command from the user, the controller 4 determines whether the number of prints is to be set with regard to an image, which is not an original image, that is to be modified or that has already been modified (step S204).

If it is determined that the number of prints is to be set with regard to an image that is to be modified or that has already been modified, then, in a manner similar to that at step S103, the number of prints is set for the specified image by the print-count setting unit 1 (step S205).

The controller 4 stores the set number of prints in association with the specified frame in a manner similar to that of step S104 (step S206).

If it is determined at step S204 that an image to be modified or that has been modified is not to be printed, or after the number of prints is set at step S205 and S206 with regard to an image to be modified or that has been modified, then it is determined whether the number of prints is to be set for the original image (step S207).

If the controller 4 determines that the number of prints is to be set for the original image, then control proceeds to step S103 and S104, where processing for setting number of prints and storing the set number is executed and processing is exited.

On the other hand, if it is determined at step S207 that the number of prints is not to be set for the original image, then processing is exited without steps S103 and 5104 being executed.

It should be noted that the decision process of step S207 and processes performed in a case where a "YES" decision is rendered at step S207 are effective only in a case where data of an original image has not been changed and remains on a recording medium such as film or a memory.

Thus, in a case where an image that has been processed is displayed and can be recognized on a display device or index print in the event that image processing conditions have been set, a case where the image display itself is not performed, and a case where an original image is being displayed even though image processing conditions have been set, the control in the manner described above makes it possible to notify the user, by means of the warning issued by warning unit 2, of the fact that image processing conditions have been set. As a result, it is possible to prevent a situation in which the user sets a number of prints without noticing that this image is different from the original image.

Thus, in accordance with the second embodiment, as described above, a warning is indicated in a case where a user attempts to set a number of prints for an image for which image processing conditions have been set. The makes it possible to prevent the user from mistakenly setting the number of prints for an unintended image. In addition, it is possible to set the desired number of prints for a modified image and for the original image as well. Wasteful printing can be prevented while the convenience of being able to specify the number of prints of an original image is maintained.

In the first and second embodiments, it is so arranged that the number of prints is set and stored. However, similar effects can be obtained also when setting print information, i.e., when setting print size, aspect ratio of the paper printed on, quality such as glossy or semi-glossy, medium on which printing is performed, etc.

Third Embodiment

Figure 4:
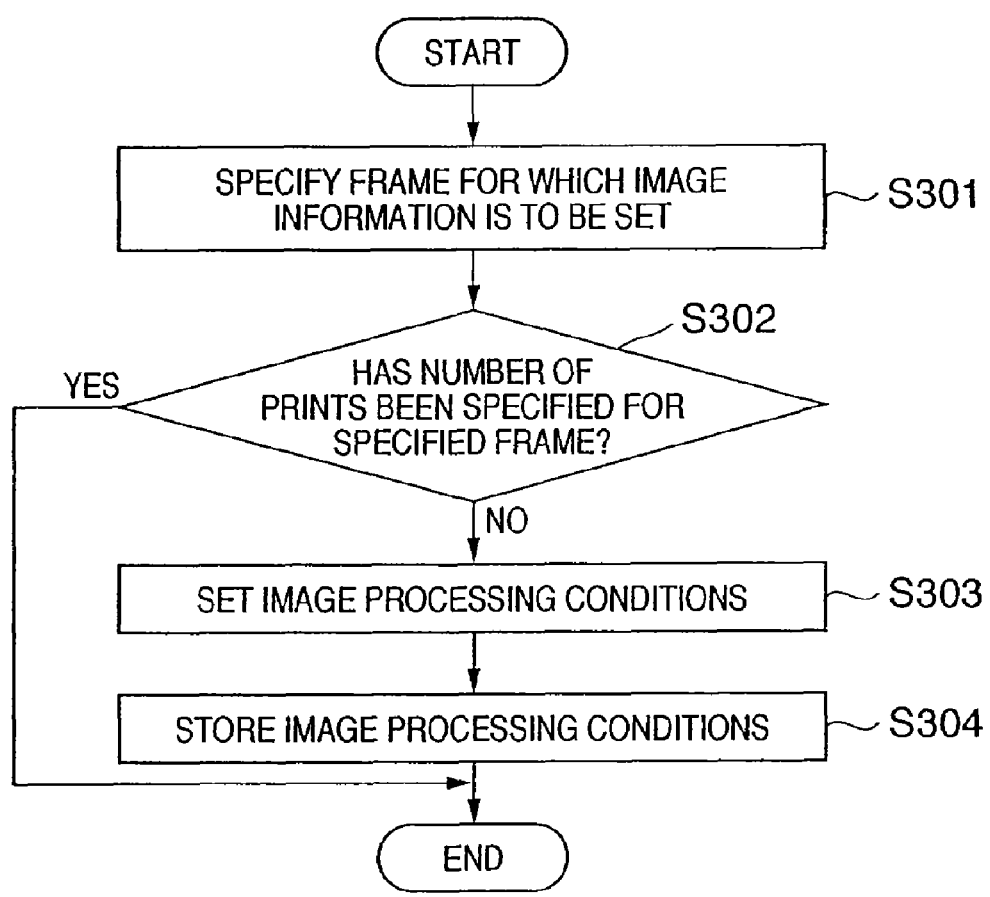
FIG. 4 is a flowchart illustrating the operation of the image processing apparatus according to a third embodiment of the present invention.

FIG. 4 is a flowchart illustrating processing for setting image processing conditions in an image processing apparatus according to a third embodiment of the present invention. The third embodiment will be described with regard to a case where image processing conditions are set for a frame for which the number of prints has been set. The structure of the image processing apparatus is similar to that described with reference to FIG. 1 in the first embodiment and description thereof is omitted here.

First, the controller 4 specifies a frame for which image processing conditions will be set (step S301). By way of example, the operation in step S101 corresponds to an operation of specifying a frame for which the original image is to be subjected to processing for changing the color tone of the image to sepia tone or black-and-white tone, etc., for changing sharpness in order to make the image a soft-focused photograph, for trimming a specific portion of the image, for synthesising a plurality of images to produce, inter alfa, a panoramic image, for synthesising an additional image such as characters or decorated characters, for deforming the image, and for inverting the image.

Next, the controller 4 determines whether the number of prints has been set for the frame specified at step S301 (step S302). For example, the number of prints is recorded magnetically as IX information in the case of APS film or is recorded as auxiliary information of the image data in case of digital image data obtained from a digital camera or the like.

If the controller 4 determines at step S302 that the number of prints has not been set for the specified frame, the desired image processing conditions are set for the image of the specified frame by the shot-image information setting unit 5 (step S303). Since the way this information is set is not directly related to the gist of the present invention, it is not described here.

The controller 4 records the set image processing conditions in association with the specified frame (step S304), after which this series of processing is exited. It should be noted that the image processing conditions also are recorded in a manner similar to that of the number of prints. For example, in the case of APS film, the image processing conditions may be recorded magnetically as IX information. In the case of digital image data obtained from a digital camera or the like, the image processing conditions are recorded as auxiliary information of image data. Furthermore, with respect to digital image data, after an original image has been processed using set image processing conditions, there are also instances where recording is by overwriting the original image with the processed image.

On the other hand, if the controller 4 determines at step S302 that the number of prints has been set for a frame for which setting of image processing conditions has been specified, the processing is exited without steps S303 and 5304 being executed.

Thus, in accordance with the third embodiment, as described above, image processing conditions can be set only with regard to a frame for which the number of prints has not been set. As a result, it is possible to prevent needless prints by eliminating a situation in which image processing conditions are mistakenly set with regard to a frame for which the number of prints has been set and the image obtained by modification based upon these set image processing conditions is printed in the number of prints that was set prior to the setting of image processing conditions.

Fourth Embodiment

Figure 5:
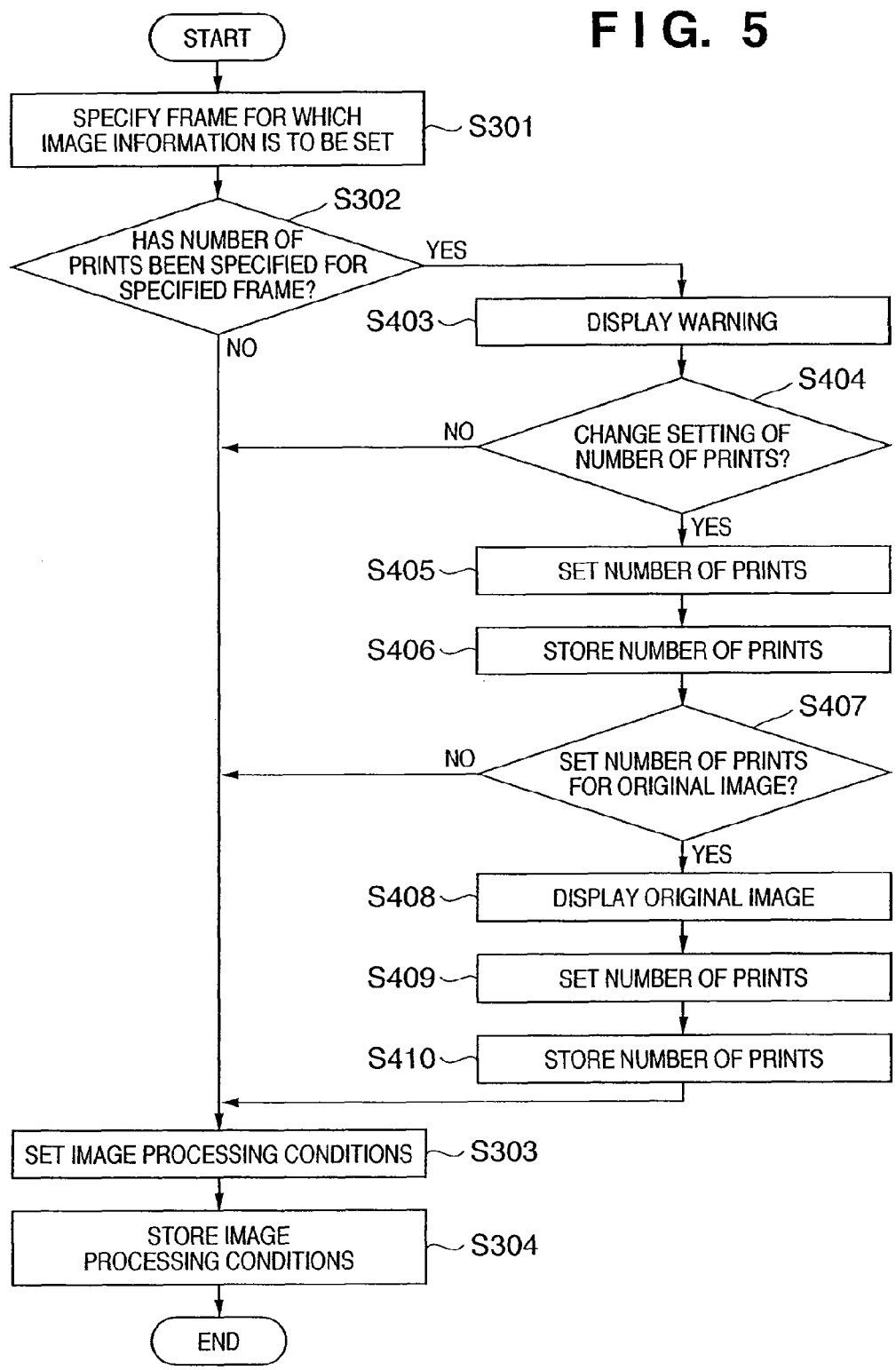
FIG. 5 is a flowchart illustrating the operation of the image processing apparatus according to a fourth embodiment of the present invention.

FIG. 5 is a flowchart illustrating an operation for setting image processing conditions and the number of prints in an image processing apparatus according to a fourth embodiment of the present invention. The structure of the image processing apparatus is similar to that described with reference to FIG. 1 in the first embodiment and description thereof is omitted here. In the processing of FIG. 5, steps similar to those shown in FIG. 4 are designated by like step numbers.

First, in a manner similar to that of step S301 in FIG. 4, the controller 4 specifies a frame for which image processing conditions will be set (step S301).

Next, the controller 4 determines whether the number of prints has been set for the frame specified at step S301 (step S302).

If the controller determines at step S302 that the number of prints has not been set for the specified frame, image processing conditions are set for the image of the specified frame by the shot-image information setting unit 5 (step S303). The controller 4 records the set image processing conditions (step S304) and then exits this processing.

On the other hand, if the controller 4 determines at step S302 that the number of prints has been set for a frame for which setting of image processing conditions has been specified, then the controller 4 issues a warning by the warning unit 2 in order to warn or alert the user of this fact (step S403). The warning in this case may be a warning indication on a screen, a warning issued by a light-emitting element or a warning by voice.

Next, the controller 4 determines whether the already set number of prints is to be changed with regard to the frame for which image processing conditions are to be set (step S404).

If a "YES" decision is rendered at step S404, then the number of prints is set again for this specified frame by the print-count setting unit 1 (step S405). The re-setting of number of prints is already well known in APS cameras and some viewers and description there of is omitted here.

The controller 4 stores the re-set number of prints in association with the specified frame (step S406).

Next, it is determined whether to set the number of prints for an original image (step S407). If the number of prints of the original image is to be set, then the original image is displayed (step S408), the number of prints for the original image is set (step S409) and the set number of images is stored (step S410). After this series of processing ends, control proceeds to step S303 to set image processing conditions. It should be noted that the processing of step S408 is processing that allows the user to check the original image by displaying it in a case where image processing conditions have already been set for a frame specified for setting of image processing conditions and a display is being presented in which the image processing conditions are reflected. Accordingly, the processing of step S408 can be omitted in a case where the image of a specified frame is an original image or a case where an image is not displayed.

Further, it may be so arranged that in a case where an original image no longer exists (e.g., a case where digital image data has been processed based upon set image processing conditions, after which the original image is overwritten by the processed image data), the processing from step S407 onward is not executed. Further, it may be so arranged that the image data that has been processed is regarded as an original image and processing continues from step S407 onward.

If it has been determined at step S404 that the number of prints of the modified image will not be changed, or if setting of number of prints of the original image is not performed at step S407, control proceeds to step S303, where image processing conditions are set.

Thus, in accordance with the fourth embodiment, upon setting image processing conditions, a warning is issued in a case where the number of prints has already been set, in advance of the setting of image processing conditions, for an original image or for an image that has been modified. This makes it possible to prevent needless printing of a modified image.

Further, after it is verified whether the number of prints is to be set for an image that will be modified again in the future, the number of prints can be set. As a result, a desired number of prints of a desired image can be printed without waste.

Further, convenience is afforded since it is possible to set a number of prints also for an image before the image is re-modified.

In the third and fourth embodiments, only the setting of number of prints is determined at step S302, S405 and S409. However, similar effects can be obtained also when setting print information, i.e., when setting print size, aspect ratio of the paper printed on, quality such as glossy or semi-glossy, medium on which printing is performed, etc.

Further, whether an original image is to be printed or not is determined at step S407. However, similar effects can be obtained since desired images can be printed in the number intended by the user even if it is determined whether number of prints is to be set not only for an original image but also for an image that has been modified based upon already set image processing conditions.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling an image processing apparatus that sets a number of prints for each image, comprising:
   specifying an image of interest for which image processing conditions other than a number of prints are to be set;
   determining whether a number of prints has been set for the specified image of interest;
   accepting setting of image processing conditions other than a number of prints after displaying a warning message if the number of prints has been set for the specified image of interest;
   accepting setting of image processing conditions without displaying the warning message if the number of prints has not been set for the specified image of interest; and
   storing in a memory the accepted image processing conditions in correlation with the image of interest.

2. The method according to claim 1, further comprising forbidding the accepted setting of image processing conditions to be stored if forbidding is designated by a user in response to the warning message.

3. The method according to claim 1, wherein the image processing conditions include a condition for changing at least any one of image color tone, sharpness, gradation, trimming and enlargement magnification, image synthesis, deformation, and inversion.

4. An image processing apparatus comprising:
   an image input unit adapted to input images;
   a processing-condition setting unit adapted to set desired image processing conditions other than a number of prints for an image;
   a print-count setting unit adapted to set a number of prints for each image;
   a controller adapted to specify an image of interest for which a number of prints is to be set, determine whether image processing conditions have been set for the specified image of interest, accept setting of a number of prints after displaying a warning message if the image processing conditions have been set for the specified image of interest, and accept the setting of a number of prints without displaying the warning message if no image processing conditions have been set for the specified image of interest; and
   a storage unit adapted to store the accepted number of prints in correlation with the image of interest.

5. The apparatus according to claim 4, wherein said controller forbids the accepted setting of number of prints to be stored if forbidding is designated by a user in response to the warning message.

6. The apparatus according to claim 4, wherein the image processing conditions include a condition for changing at least any one of image color tone, sharpness, gradation, trimming, enlargement magnification, image synthesis, deformation, and inversion.

7. An image processing apparatus that sets a number of prints for each image, comprising:
   a specifying unit adapted to specify an image of interest for which image processing conditions other than a number of prints are to be set;
   a determination unit adapted to determine whether a number of prints has been set for the image of interest specified by said specifying unit;
   a control unit adapted to accept setting of image processing conditions other than a number of prints after displaying a warning message if the number of prints has been set for the specified image of interest, and to accept setting of image processing conditions without displaying the warning message if the number of prints has not been set for the specified image of interest; and
   a memory adapted to store the accepted image processing conditions in correlation with the image of interest.

8. The apparatus according to claim 7, wherein the control unit forbids the accepted setting of image processing conditions to be stored if forbidding is designated by a user in response to the warning message.

9. The apparatus according to claim 7, wherein the image processing conditions include a condition for changing at least any one of image color tone, sharpness, gradation, trimming and enlargement magnification, image synthesis, deformation, and inversion.

10. A method of controlling an image processing apparatus having an image input unit adapted to input images, comprising:
    setting desired image processing conditions other than a number of prints for an image;
    setting a number of prints for each image;
    specifying an image of interest for which a number of prints is to be set;
    determine whether image processing conditions have been set for the specified image of interest;
    accepting setting of a number of prints after displaying a warning message if the image processing conditions have been set for the specified image of interest, and accepting the setting of a number of prints without displaying the warning message if no image processing conditions have been set for the specified image of interest; and
    storing in a memory the accepted number of prints in correlation with the image of interest.

11. The method according to claim 10, further comprising forbidding the accepted setting of number of prints to be stored if forbidding is designated by a user in response to the warning message.

12. The method according to claim 10, wherein the image processing conditions include a condition for changing at least any one of image color tone, sharpness, gradation, trimming, enlargement magnification, image synthesis, deformation, and inversion.

* * * * *